(12) United States Patent
Furuya

(10) Patent No.: US 6,568,664 B2
(45) Date of Patent: May 27, 2003

(54) FRONT FORK FOR MOTORCYCLE

(75) Inventor: Ken Furuya, Tokyo (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/973,157

(22) Filed: Oct. 10, 2001

(65) Prior Publication Data

US 2002/0040833 A1 Apr. 11, 2002

Related U.S. Application Data

(63) Continuation-in-part of application No. 09/453,483, filed on Nov. 8, 1999.

(30) Foreign Application Priority Data

Nov. 11, 1998 (JP) .......................................... 10/320252

(51) Int. Cl.$^7$ ................................................ F16F 5/00
(52) U.S. Cl. .................... 267/64.26; 188/280; 188/297; 188/288; 188/315; 280/276
(58) Field of Search ................. 188/280, 281, 188/284, 289, 297, 298, 288, 315; 267/64.19, 64.23, 64.26, 64.27, 122; 280/276

(56) References Cited

U.S. PATENT DOCUMENTS

| | | | | |
|---|---|---|---|---|
| 3,272,465 A | * | 9/1966 | Axthammer | 267/64 |
| 3,272,495 A | * | 9/1966 | Axthammer | 267/64.16 |
| 3,447,797 A | * | 6/1969 | Roberts | 267/34 |
| 3,844,543 A | * | 10/1974 | Whelan | 267/64.19 |
| 3,888,436 A | * | 6/1975 | Sealey | 244/104 FP |
| 4,240,531 A | * | 12/1980 | Postema | 188/315 |
| 4,262,779 A | * | 4/1981 | Katsumori et al. | 188/315 |
| 4,438,909 A | * | 3/1984 | Matsumoto | 267/64.26 |
| 4,443,926 A | * | 4/1984 | Pearson et al. | 29/436 |
| 4,702,356 A | * | 10/1987 | Katz et al. | 188/315 |
| 4,729,529 A | * | 3/1988 | Hrusch | 244/104 FP |
| 4,880,213 A | * | 11/1989 | Shinbori et al. | 267/64.27 |
| 4,886,248 A | * | 12/1989 | Delhaye et al. | 267/64.26 |
| 4,964,625 A | * | 10/1990 | Kawamura | 267/221 |
| 6,042,091 A | * | 3/2000 | Marzocchi et al. | 267/64.15 |
| 6,234,505 B1 | * | 5/2001 | Ito | 280/276 |

FOREIGN PATENT DOCUMENTS

| | | | |
|---|---|---|---|
| JP | 2-24140 | | 2/1990 |
| JP | 06-173998 | * | 6/1994 |
| JP | 7-174179 | * | 7/1995 |
| JP | 09174179 | * | 7/1995 |

* cited by examiner

*Primary Examiner*—Jack Lavinder
*Assistant Examiner*—Bradley King
(74) *Attorney, Agent, or Firm*—Rabin & Berdo, PC

(57) ABSTRACT

A flow restriction part (10) which provides a resistance to high speed oil is provided in a reservoir (R), and an air chamber ($A_2$) which contracts according to an oil pressure is disposed underneath this flow restriction part (10). Providing such flow restriction part and air chamber in addition to an air chamber ($A_1$), a repulsive force when the front fork contracts at high speed, such as during sudden braking, increases larger than during normal contraction while mechanical vibration caused by road unevenness during normal running is absorbed.

9 Claims, 3 Drawing Sheets

FRONT FORK FOR MOTORCYCLE

This is a continuation-in-part of Ser. No. 09/453,483, filed Nov. 8, 1999.

FIELD OF THE INVENTION

The present invention relates to a front fork for a motorcycle.

BACKGROUND OF THE INVENTION

Jikkai Hei 2-24140 published by the Japanese Patent Office in 1988 discloses a front fork which absorbs mechanical vibration caused by road unevenness, and thereby improves a ride comfort.

The repulsive force of the front fork is increased by the degree of contraction amount of the front fork by providing an air chamber in the upper part of a reservoir which contracts according to an oil pressure.

When the front fork contracts at high speed, for example when the motorcycle is suddenly braked, the repulsive force must be greatly increased compared to a usual contraction so as to maintain the motorcycle body in a correct orientation. However, with a front fork discussed above, the same repulsive force as during normal contraction could only be obtained in such situations.

SUMMARY OF THE INVENTION

It is therefore an object of this invention to suitably increase the repulsive force of the front fork when the front fork contracts at high speed during sudden braking, etc., while at the same time absorbing the mechanical vibration caused by road unevenness during normal running.

In order to achieve the above object, this invention provides a front fork for a motorcycle, comprising a first tube and second tube which are fitted together, a damper including a cylinder fixed to the second tube, a rod fixed to the first tube and inserted in the cylinder and a piston fixed to one end of the rod and housed inside the cylinder, and a reservoir connected to the cylinder. The reservoir includes a flow restriction part midway along its length, a first air chamber above the flow restriction part which is compressed according to an oil pressure, and a second air chamber below the flow restriction part which is compressed according to an oil pressure.

The details as well as other features and advantages of this invention are set forth in the remainder of the specification and are shown in the accompanying drawings.

DETAILED DESCRIPTION OF THE INVENTION

Figure 1:
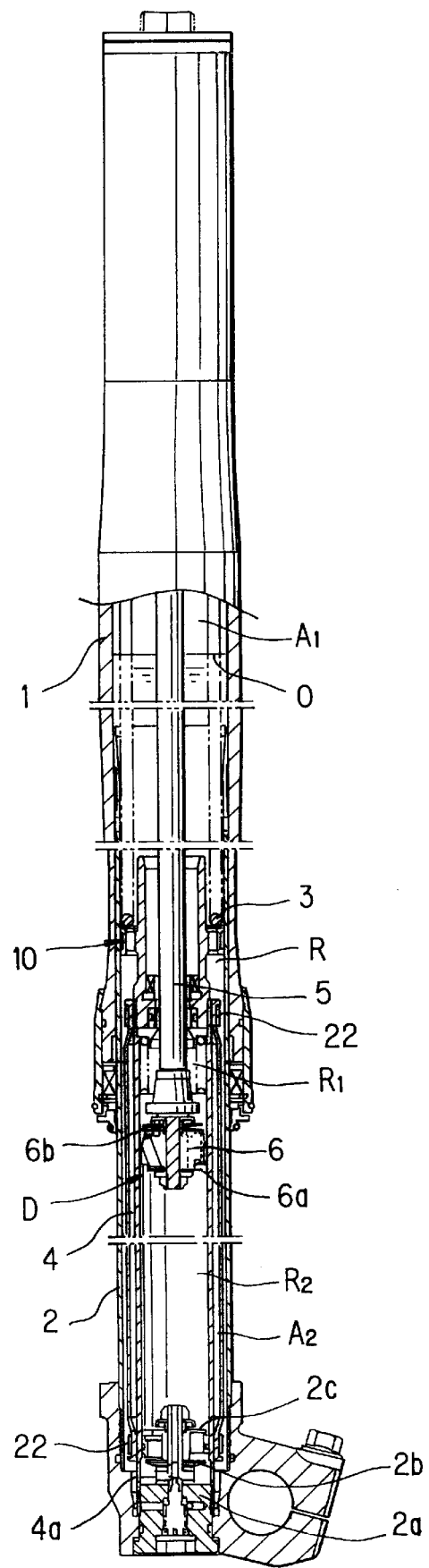
FIG. 1 is a longitudinal sectional view of a front fork according to this invention.

Referring to FIG. 1 of the drawings, an inverted front fork has an outer tube 1 connected to a motorcycle body, an inner tube 2 connected to the front wheel axle, and a damper D which generates a damping force when the front fork contracts or expands.

The inner tube 2 is inserted from the lower end of the outer tube 1, and the inner tube 2 is pushed so that the inner tube 2 projects from the outer tube 1 due to a spring 3.

A reservoir R is formed between the outer tube 1, inner tube 2 and damper D. The reservoir R contains oil, but a first air chamber $A_1$ is provided in the upper part. The line O in the figure represents the surface of the oil.

The damper D comprises a cylinder 4 fixed to the inner tube 2 so that there is a cylindrical clearance with the inner tube 2, a rod 5 fixed to the outer tube 1, the tip whereof being inserted in the cylinder 4, and a piston 6 housed in a cylinder 4 which partitions the cylinder 4 into an upper oil chamber $R_1$ and lower oil chamber $R_2$, and which is connected to the rod 5. The interior of the cylinder 4 is filled with oil.

Figure 2:
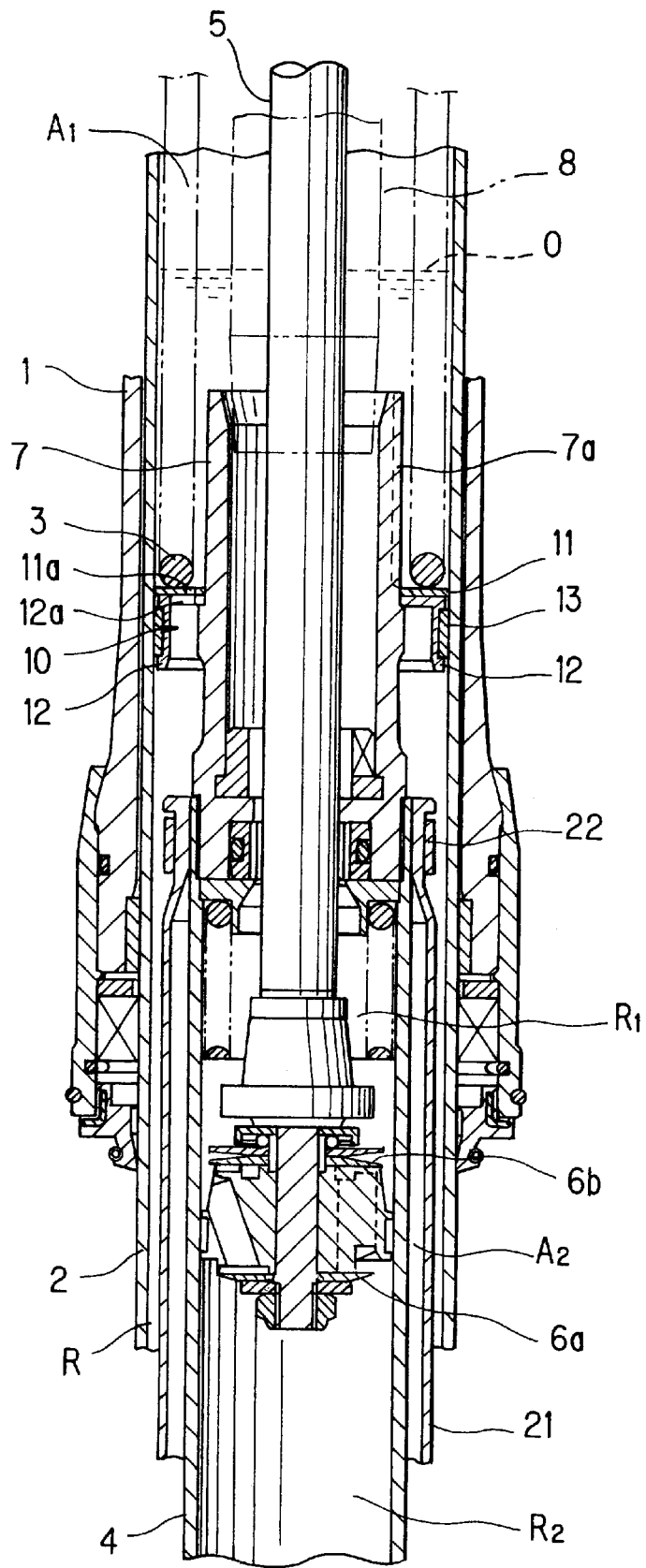
FIG. 2 is a sectional view of the middle part of the front fork.

As shown in FIG. 2, the piston 6 is provided with a damping valve 6a which allows passage of oil between the upper oil chamber $R_1$ and lower oil chamber $R_2$, and generates a predetermined damping force, and a check valve 6b which allows passage of oil only from the lower oil chamber $R_2$ to the upper oil chamber $R_1$.

Figure 3:
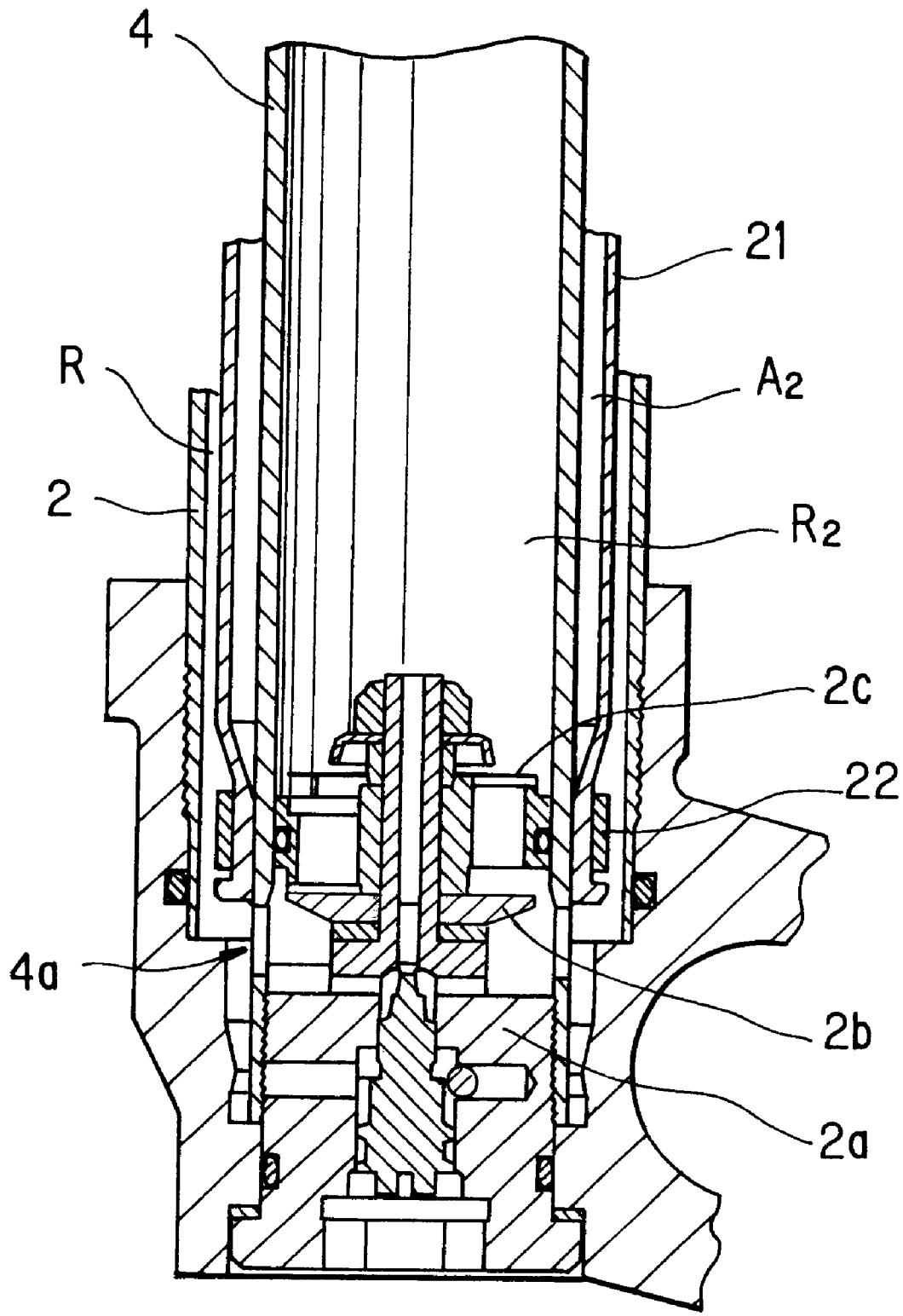
FIG. 3 is a sectional view of the lower end of the front fork.

Moreover, as shown in FIG. 3, a damping valve 2b which allows passage of oil between the reservoir R and lower oil chamber $R_2$, and generates a predetermined damping force, and a check valve 2c which allows passage of oil only from the reservoir R to the lower oil chamber $R_2$, are provided in a base 2a which closes the lower end of the cylinder 4.

During contraction, the damper D expels an oil amount equal to the penetration volume of the rod 5 into the reservoir R via a hole 4a formed in the cylinder 4, and during extension, aspirates an oil amount equal to the withdrawal volume of the rod 5 from the reservoir R via the hole 4a.

The reservoir R comprises a flow restriction part 10 midway along its length, and a second air chamber $A_2$, which is compressed according to the oil pressure, underneath the flow restriction part 10. This second air chamber $A_2$ is compressed, and the repulsive force of the front fork is increased, when the oil pressure in the reservoir R rises.

The second air chamber $A_2$ is formed between the cylinder 4 and a bellows 21 which is an elastic body having a predetermined mechanical strength and can be easily extended and contracted. The upper end and lower end of the bellows 21 are bound tightly to the cylinder 4 by bands 22, and the second air chamber $A_2$ is formed so that it encloses the cylinder 4.

The volume of the second air chamber $A_2$ is smaller than the volume of first air chamber $A_1$. For example, when the front fork is most extended, if the volume of the first air chamber $A_1$ is 1000 cc, the volume of the second air chamber $A_2$ is 60 cc. The pressure of the first air chamber $A_1$ and second air chamber $A_2$ at this time is 1 kg/cm$^2$.

The cross-sectional area of the rod 5 is 1 cm$^2$, and the cross-sectional area of the oil surface O is 10 cm$^2$ excepting the cross-sectional area of the rod 5.

The flow restriction part 10 divides the reservoir R from top to bottom between a cylindrical oil lock case 7 connected to the upper end of the cylinder 4 and the inner tube 2.

The flow restriction part 10 comprises an annular relief plate 11, and orifices 11a which restrict the oil flow are formed in the relief plate 11.

The relief plate 11 is fitted on the outer circumference of the oil lock case 7 and mounted on a support 12 which acts as a spring seat of a spring 3.

The orifices 11a are formed near the inner circumference of the relief plate 11 such that they are not blocked by the spring 3. The support 12 has an opening 12a facing the orifices 11a, and is in contact with the inner tube 2 via a bearing 13.

Instead of the orifices 11a, the flow restriction part 10 may comprise a gap between the bearing 13 and the inner tube 2 for restricting the oil flow. In this case, there is no need to form the orifices 11a in the relief plate 11.

When the front fork is most contracted, an oil lock piece 8 fixed to the upper part of the rod 5 engages with the oil lock case 7, so that the shock associated with bottom fitting is mitigated. Therefore, when the front fork contracts at low or medium speed, the flow restriction part 10 permits the oil to flow through the orifices 11a. On the other hand, when the front fork contracts at high speed, the flow restriction part 10 offers a resistance and prevents passage of high speed oil.

When large contractions occur repeatedly in a very short interval, and the pressure under the flow restriction part 10 rises, the relief plate 11 lifts when the load of the spring 3 is reduced due for example to extension of the front fork, and the pressure under the flow restriction part 10 is discharged above the flow restriction part 10.

As longitudinal grooves 7a are formed in the outer circumference of the oil lock case 7, when the relief plate 11 lifts, its upper and lower parts are connected through the grooves 7a so that this release of pressure occurs quickly.

As the oil lock piece 8 engages with the inside of the case 7, although the grooves 7a are formed in the outer circumference of the case 7, they are not an obstacle to their function as an oil lock mechanism.

During contraction/extension, the front fork having the aforesaid construction generates a damping force due to the damper D. During contraction, it also operates as follows according to the contraction speed.

[1] When the Front Fork Contracts at High Speed

When the front fork contracts at high speed, the speed at which oil above the flow restriction part 10 flows underneath the flow restriction part 10 also increases. Therefore, the flow restriction part 10 offers a resistance, and the reservoir R is divided into upper and lower parts on the side of the first air chamber $A_1$ and second air chamber $A_2$ by the flow restriction part 10.

As a result, the second air chamber $A_2$ is compressed only by the inflow of oil expelled from the contracting damper D to the reservoir R, i.e., only by increase of oil pressure under the flow restriction part 10, and the restoring force of second air chamber $A_2$ at this time acts on the rod 5 (hereafter referred to as "rod repulsive force").

On the other hand, the first air chamber $A_1$ is compressed only by penetration of the inner tube 2 into the outer tube 1, i.e., only by rise of the oil surface 0, and the restoring force of the first air chamber $A_1$ at this time acts on the outer tube 1 (referred to hereafter as "tube repulsive force").

Consequently, when the front fork contracts at high speed, the above-mentioned rod repulsive force and tube repulsive force are combined, and this becomes a repulsive force when the front fork contracts together with the spring force of the spring 3.

The rod repulsive force and the tube repulsive force may specifically be described as follows.

When the front fork contracts at high speed, the resistance of the flow restriction part 10 is large, and the first air chamber $A_1$ and second air chamber $A_2$ are respectively compressed without establishing pressure equilibrium. If the volume of the first air chamber $A_1$ changes from 1000 cc to 100 cc, and the volume of the second air chamber $A_2$ changes from 60 cc to 30 cc, the compression ratio in the first air chamber $A_1$ is:

$$1000 \ cc/100 \ cc = 10$$

and the compression ratio in the second air chamber $A_2$ is:

$$60 \ cc/30 \ cc = 2$$

Therefore, the tube repulsive force is:

$$10 \ cm^2 \times 10 \ kg/cm^2 = 100 \ kgf$$

and the rod repulsive force is:

$$1 \ cm^2 \times 2 \ kg/cm^2 = 2 \ kgf$$

The sum of these, i.e., 102 kgf, is added to the spring force of the spring 3.

[2] When the Front Fork Contracts at Medium or Low Speed

Oil expelled from the contracting damper D flows out into the reservoir R and the inner tube 2 enters the outer tube 1, so the oil surface O rises, and the first air chamber $A_1$ is compressed.

At this time, the rate at which oil above the flow restriction part 10 flows underneath the 10 also becomes slow. Therefore, the resistance of the flow restriction part 10 becomes small, and the first air chamber $A_1$ and second air chamber $A_2$ are compressed while their pressures are balanced, i.e., their pressures are almost equal.

The repulsive force at this time may specifically be described as follows.

If the compression is the same as that described in the example given above in (1), the compression ratio is:

$$(1000 \ cc + 60 \ cc)/(100 \ cc + 30 \ cc) \cong 8.2$$

Therefore, the repulsive force at this time is:

$$(10 \ cm^2 + 1 \ cm^2) \times 8.2 \ kg/cm^2 = 90.2 \ kgf$$

and this repulsive force is added to the spring force of the spring 3.

Thus, when the front fork contracts at high speed, a large repulsive force can be generated as compared with the case where the front fork contracts at medium or low speed.

Therefore, while mechanical vibration caused by road unevenness is absorbed during normal running and a high degree of riding comfort is maintained, when the front fork contracts at high speed due to sudden braking, etc., a larger repulsive force can be generated as compared to normal contraction. As a result, the nosedive is prevented and the proper orientation of the motorcycle can be maintained.

Moreover, even when the front fork contracts at high speed, oil is not blown into the first air chamber $A_1$ due to the flow restriction part 10, so mixing of air and oil is prevented and the damping force can be stabilized.

The second air chamber A2 in the bellows 21 compensates the increase of oil amount in the cylinder 4 due to the contraction of the rod 5 into the cylinder 4 and compensates the decrease of oil amount in the cylinder 4 due to the extraction of the rod from the cylinder 4. Due to this compensation, oil is not blown into the first air chamber A1 when the front fork contracts, so mixing of air and oil in the first air chamber A1 is prevented. Further, due to this compensation, mixture of air and oil is not aspirated from the first air chamber A1 to the cylinder 4 when the rod 5 extracts from the cylinder 4. Thus the damping force of the front fork can be further stabilized.

In the above description, the second air chamber $A_2$ is disposed on the outer circumference of the cylinder 4, but a different construction is possible provided that the second air chamber $A_2$ is underneath the flow restriction part 10.

For example, the second air chamber $A_2$ may be provided on the inner circumference of the inner tube 2, or alternatively, the second air chamber $A_2$ may be formed in the shape of an independent contractile bag which is housed free to move underneath the flow restriction part 10.

However, the second air chamber $A_2$ and the flow restriction part 10 are arranged so as not to interfere with each other.

Further, the relief plate 11 of the flow restriction part 10 is pushed against the support 12 by the spring 3, but it may be pushed against the support 12 by a spring which is provided separately. Moreover, the flow restriction part 10 may have a construction other than that described here.

Further, the air chambers $A_1$, $A_2$ are filled with air but they may be filled with a gas which is not air.

Further, the front fork described here has been described as an inverted front fork, however the front fork may be a non-inverted front fork wherein the outer tube is connected to the front wheel axle, the inner tube is connected to the motorcycle body, the damper rod is connected to the inner tube, and the damper cylinder is connected to the outer tube.

The embodiments of this invention in which an exclusive property or privilege is claimed are defined as follows:

What is claimed is:

1. A front fork for a motorcycle, comprising:
   a first tube and second tube which are fitted together;
   a damper including
      a cylinder fixed to the second tube,
      a rod fixed to the first tube and inserted in the cylinder, and
      a piston fixed to one end of the rod and housed inside the cylinder;
   a bellows bound to an outer surface of the cylinder; and
   a reservoir connected to the cylinder, the reservoir including
      a flow restriction part midway along a length of the reservoir, and dividing the reservoir into an upper and lower part, said flow restriction part allowing an oil flow from the upper part to the lower part, and from the lower part to the upper part, said flow restriction part restricting the oil flow between the upper part and the lower part,
      a first air chamber above the flow restriction part which is compressed according to an oil pressure,
      a second air chamber below the flow restriction part and being disposed between the cylinder and the bellows, and which is compressed according to an oil pressure, and
   a shock reducing mechanism which reduces shock generated when the front fork most contracts.

2. A front fork as defined in claim 1, wherein
   the shock reducing mechanism including
   a first member provided on the cylinder, and
   a second member provided on the rod, which engages with the first member when the front fork most contracts.

3. A front fork as defined in claim 1, further comprising a relief valve which opens and allows an oil flow from the lower part to the upper part after the oil pressure in the lower part rises to a predetermined pressure.

4. A front fork as defined in claim 1, wherein the relief valve opens after large contractions of the front fork have occurred repeatedly and the oil pressure in the lower part rises.

5. A front fork as defined in claim 1, wherein the relief valve opens when the font fork extends after large contractions of the front fork have occurred repeatedly and the oil pressure in the lower part rises.

6. A front fork as defined in claim 1, wherein the relief valve is an elastic plate provided between the upper part and the lower part, and the flow restriction part is an orifice formed in the plate.

7. A front fork as defined in claim 1, wherein the upper end and lower end of the bellows are bound to the cylinder.

8. A front fork as defined in claim 1, wherein the bellows compensates for an increase of an oil amount in the cylinder due to the insertion of the rod into the cylinder.

9. A front fork as defined in claim 1, wherein the bellows compensates for a decrease of an oil amount in the cylinder due to the extraction of the rod from the cylinder.

\* \* \* \* \*